SYSTEM FOR SETTING SECONDARY CLOCKS

Filed Dec. 27, 1966 3 Sheets-Sheet 1

INVENTORS
R. M. DURIS AND
D. J. RIORDAN
BY Forest B. Hitchcock
THEIR ATTORNEY

INVENTORS
R. M. DURIS AND
D. J. RIORDAN
BY Forest B. Hitchcock
THEIR ATTORNEY

SYSTEM FOR SETTING SECONDARY CLOCKS

Filed Dec. 27, 1966

INVENTORS
R. M. DURIS AND
D. J. RIORDAN

BY Forest B. Hitchcock

THEIR ATTORNEY

United States Patent Office

3,490,225
Patented Jan. 20, 1970

3,490,225

SYSTEM FOR SETTING SECONDARY CLOCKS

Rudolph M. Duris, Norwalk, and David J. Riordan, Fairfield, Conn., assignors to Edwards Company, Inc., Norwalk, Conn., a corporation of Connecticut

Filed Dec. 27, 1966, Ser. No. 605,006
Int. Cl. G04c *9/00, 13/04*
U.S. Cl. 58—35 9 Claims

ABSTRACT OF THE DISCLOSURE

A remotely controlled setting sysem for secondary electric clocks operable selectively to provide hourly reset and 12-hour reset and immediate reset upon restoration of power. A relay is energized by a normal drive circuit in each secondary clock, and this relay is a switching means which selects between the use of energy over a reset line from a master clock location to drive a reset motor or to control a clutch for hourly or 12-hour reset. The relay is de-energized by momentarily removing drive energy while transmitting a reset pulse from the master location for designating hourly correction, and for a second pulse for designating 12-hour correction.

BACKGROUND OF THE INVENTION

This invention relates to systems for correcting the setting of secondary electric clocks by the selective energization of a reset communication channel connecting a master clock location to one or more secondary clocks, and it more particularly relates to such a system wherein remotely controlled switching means in each secondary clock selects one of a plurality of resetting means for control from the master clock location over the reset communication channel.

Systems are known in the art for resetting secondary clocks after power is restored to a system in accordance with the measurement of the duration of power interruption. This resetting means is known as "immediate reset," because it is rendered effective upon restoration of power without waiting until a particular minute or hour manifestation by a master clock. One system for providing immediate reset is to have the secondary clocks connected to a master clock location by a normal operating channel and a reset channel. The normal channel can be a circuit which is normally energized with alternating current from a power supply, and the reset channel can be a circuit which is de-energized except at times where designation of conditions for reset is desired. Such a system is disclosed in the U.S. patent of R. M. Duris, No. 3,282,043.

Other systems are known wherein hourly correction is provided for each secondary clock by resetting the clock to a predetermined time manifestation once every hour in response to a distinctive pulse, such as a high frequency pulse superimposed upon a normal operating circuit. It has been further provided that if a second high frequency pulse is transmitted, the secondary clocks can be controlled to provide a 12-hour correction.

Intermediate reset is desirable because this permits resetting all of the clocks immediately upon restoration of power after a power interruption without waiting for correction on the hour, or at the next 12-hour correction time. Hourly and 12-hour correction are desirable to periodically bring all clocks into synchronism to correct for any of a number of conditions that may cause one or more clocks to become out of synchronism with the system. Hourly correction will correct on the hour all clocks that are not more than one hour slow, and 12-hour correction will correct at each predetermined 12-hour time all clocks that are as much as several hours slow.

An object of the present invention is to provide an improved system for setting secondary clocks wherein each secondary clock can be reset selectively either by energization of a reset channel controlling the clock for immediate reset upon restoration of power to the system or periodically by hourly initiation of reset cycles in response to pulses applied to the reset channel at a master clock location.

Other objects, purposes and characteristic features of the present invention will be in part obvious from the accompanying drawings, and in part pointed out as the description progresses.

SUMMARY OF THE INVENTION

The system according to the present invention superimposes upon the normal operating channel a remote switch control governed from a master clock location whereby switching means, such as a relay, in each secondary clock selects as to whether energization of a reset channel at the master location is to be used for operation of a reset motor in each secondary clock for im-normally energized from the normal operating channel which also remains energized during immediate reset be-mediate reset, or is to be used for energization of magnetic means in the secondary clocks to engage clutches in these clocks for hourly and 12-hour reset. This relay is cause both a normal drive motor and an instant reset motor are in operation at this time. Thus, when the relay is energized, the immediate reset motor in each secondary clock is connected to the reset channel.

For hourly reset, power is removed from the normal operating channel during the transmission of an hourly reset pulse, and a clutch control magnet is operated from the reset channel. The reset motor in each secondary clock is disengaged from the reset channel by the relay when the hourly reset pulse is received. The reset pulse causes the operation of a clutch control lever in each secondary clock, and this lever is limited in its operation in response to a first pulse by an hourly reset latch.

This limited position permits only hourly correction, which takes place within a one-minute interval. If a second pulse is transmitted over the reset channel at a given time after the termination of the first pulse, such as at the end of an 8-second interval, for example, the hourly reset latch is disengaged, and the reception of a second pulse permits the lever to be operated to a second operated position in which it is latched by 12-hour reset latching means to maintain the clutch engaged for a period of time permitting 12-hour correction.

In describing the invention in detail, reference is made to the accompanying drawings wherein similar reference characteristics are used throughout the several figures for designation of corresponding parts, and wherein.

Figure 4A:
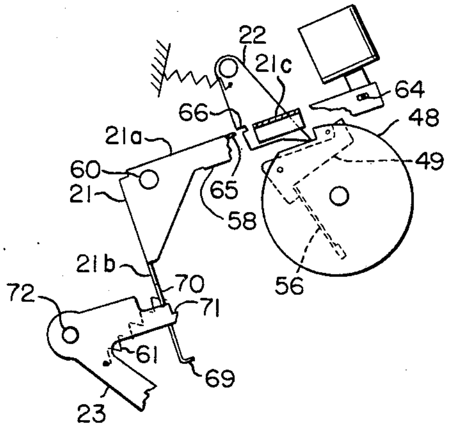
Figure 4B:
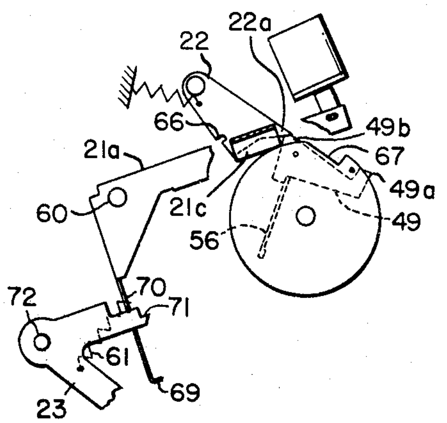
Figure 4C:
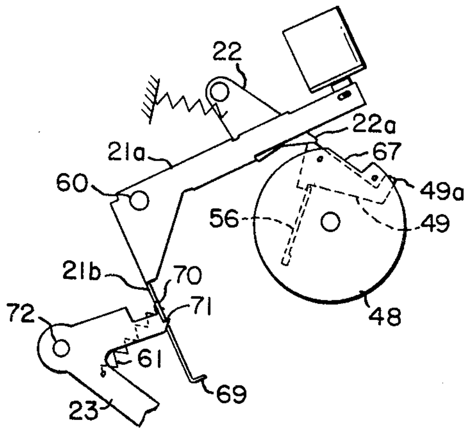

FIGS. 4A, 4B and 4C are elevational views of resetting means illustrating successive steps in the operation of the reset clutch control lever wherein FIG. 4A illustrates the condition of the resetting means upon operation in response to a first pulse; wherein FIG. 4B illustrates the condition of resetting means approximately 8 seconds after the termination of the first pulse; and wherein FIG. 4C illustrates the condition of the resetting means upon reception of a second pulse for providing 12-hour correction.

GENERAL ORGANIZATION

Figure 1:
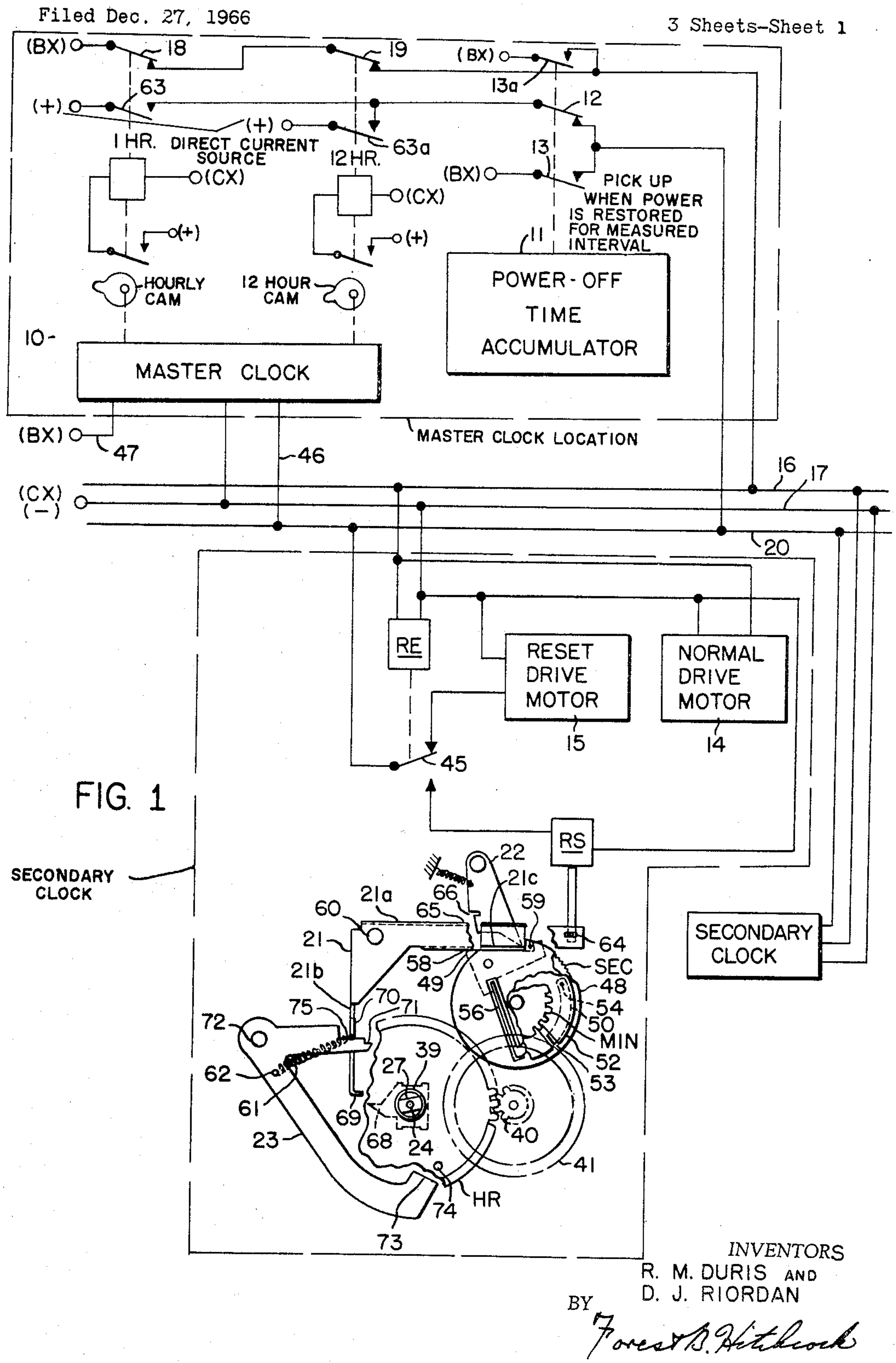
FIG. 1 illustrates a primary-secondary clock control system according to one embodiment of the present invention including an elevational view of parts of a secondary clock which relate primarily to resetting operation.

With reference to FIG. 1, the system comprises a master clock 10, which has associated therewith at the master clock location a power-off time accumulator 11. The master clock 10 also has associated therewith relays 1HR and 12HR, which are used in forming first and second pulses respectively for hourly and 12-hour correction. These relays are energized at predetermined time manifestations of the master clock movement for short time intervals, such as 25 milliseconds, for example, to govern the duration of the reset pulses. The relays 1HR can be controlled, for example, to be energized for 25 milliseconds each time the master clock movement manifests 58 minutes, and the relay 12HR can be controlled to be energized for 25 milliseconds each time the master clock movement manifests 58 minutes, 8 seconds at a selected hour, such as after 4 a.m., for example.

The power-off time accumulator 11 can be a spring driven timer, or battery driven standby movement, that is normally inactive and is started in response to a power interruption. The accumulator 11 normally manifests a zero accumulation of time, and under these conditions, as is illustrated in FIG. 1, a switch controlled by the accumulator operates its contacts 12 and 13 to lower positions whereby back contact 12 is normally closed and front contact 13 is normally open. Whenever any accumulated time is manifested by the accumulator 11, the switch controlled by the accumulator 11 is operated to its upper position to open back contact 12 and close front contact 13.

When initiated by a power interruption, the accumulator 11 is driven at a normal time rate to time the interval during which the power is off. The accumulator 11 is driven in reverse in response to the restoration of power at faster than normal time rate to time an immediate reset interval for the secondary clocks. When the accumulator 11 is driven back to its zero time accumulated manifest condition, the front contact 13 becomes opened and the immediate reset interval is terminated.

With reference to FIG. 1, each of the secondary clocks in the system comprises a synchronous normal drive motor 14, a synchronous reset motor 15, a reset control relay RE and a reset solenoid RS. The normal drive motor 14 of each of the secondary clocks is energized over a normal drive channel having a circuit including wires 16 and 17. Alternating current energy is supplied to wire 16 through back contacts 18 and 19 of relays 1HR and 12HR respectively. The reset drive motor 15 of each of the secondary clocks is energized by alternating current over a reset control channel having a circuit including wires 20 and 17. This circuit is normally de-energized, and its function in the system will be hereinafter considered.

Each of the secondary clocks, in addition to having a somewhat conventional time keeping movement, has a reset control lever 21 having a clutch control arm 21*a* and a 12-hour reset control arm 21*b*. Associated with each reset lever 21 is a one hour reset latch 22 and a 12-hour reset latch 23.

The second-hand movement operates a toothed disc SEC at a rate of 1 revolution per minute; the movement driving the minute hand operates a minute gear MIN at 1 revolution per hour; and the movement driving the hour hand operates an hour gear HR at 1 revolution for every 12 hours.

NORMAL MOVEMENT

Figure 2:
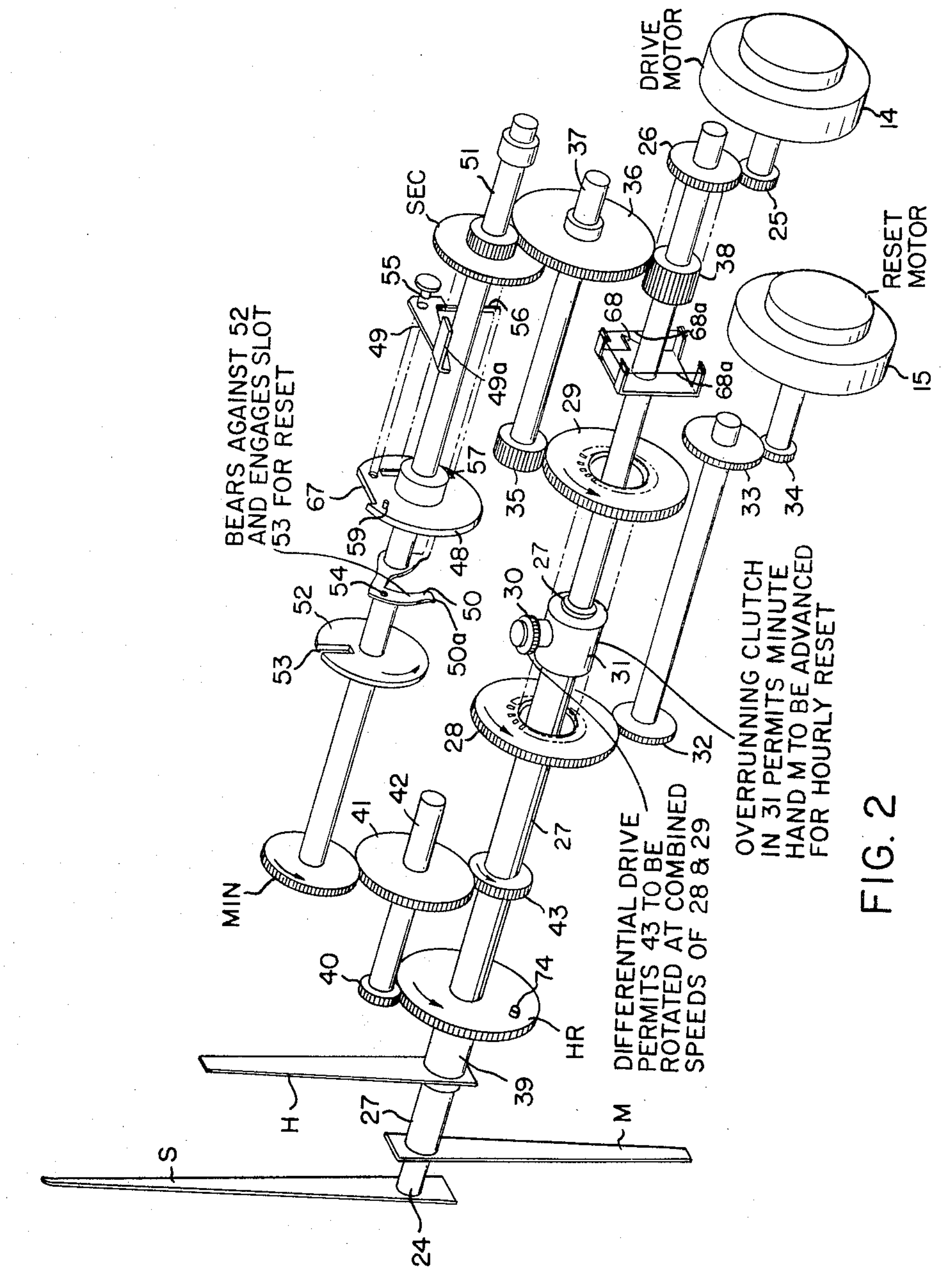
FIG. 2 is an exploded view in perspective of a clock movement of a secondary clock according to the present invention with certain reset control parts removed.

The normal movement of the secondary clock as shown in FIG. 2 provides for the rotation of a shaft 24 for driving a seconds hand S by the drive motor 14 through pinion 25 which meshes with gear 26, which in turn is operably securen on the seconds shaft 24. The minute hand M is driven by a minute sleeve 27 which is rotated by a differential comprising end gears 28 and 29 and a spider gear 30 on a spider sleeve 31 which journals the end gears 28 and 29. The spider sleeve 31 is rotated by either or both of the end gears 28 and 29 because these gears both have teeth which engage the spider gear 30. The gear 28 is normally retained in a fixed position because it meshes with a pinion 32 that is driven through gear 33 and pinion 34 by the reset motor 15. The reset motor 15 is normally de-energized. Thus the minute hand M is normally rotated by engagement of the minute sleeve 27 within the spider sleeve 31, which is rotated by gear 29. Gear 29 meshes with a pinion 35 which is driven by a gear 36 journalled on a shaft 37. Gear 36 meshes with a pinion 38 on the seconds shaft 24 which is rotated by gear 26.

The hour hand H is secured to an hour sleeve 39 which is rotated by an hour gear HR. The hour gear HR meshes with a pinion 40 which is driven by a gear 41 and journalled on a shaft 42. The gear 41 is rotated by pinion 43 on sleeve 27 which is driven by the spider sleeve 31 through an overrunning clutch. A conventional overrunning clutch can be used such, for example, as a clutch having radially disposed openings in the spider sleeve 31. Each of these openings contains a ball biased by a spring in a manner to permit the sleeve 27 and thus the minute hand H to be rotated by the normal movement and at times at a faster rate by the resetting movement. This permits the pinion 43, and also the minute hand M to be rotated either by gear 29 of the differential, with the gear 28 held in a fixed position, or by the rotation of both of these gears under immediate reset conditions or by gear 41 under hourly and 12-hour reset conditions in a manner to be hereinafter considered.

IMMEDIATE RESET

According to the general mode of operation for immediate reset, the accumulator 11 (see FIG. 1) measures a power-off interval and the front contact 13 of the power-off time accumulator 11 becomes closed as soon as the accumulator drives away from its zero time measurement position, but no energy is applied through contact 13 until power is restored. This is because the energy applied to contact 13 (which is designated as BX) is assumed to be one terminal of a commercial source of alternating current, and the power is assumed to be off at this time. When power is restored, however, energy is applied to both the normal operating channel and the reset operating channel simultaneously, and both the normal drive motor 14 and the reset drive motor 15 start to operate, the reset drive motor 15 being energized through front contact 13 of the switching means which is controlled by the accumulator 11.

The operation of the normal motor 14 at this time is effective as has been described, and in addition, the operation of the reset motor 15 (see FIG. 2) drives the gear 28 of the differential through pinion 32 in a direction to add to the normal rate of rotation of the spider sleeve 31. Furthermore, the reset motor operates the gear 28 of the differential at 9 times normal time keeping speed, and this drive, added to the operation normally of gear 29 of the differential, produces a resultant drive for the time manifesting means of the secondary clock at a rate of 10 times normal speed.

The accumulator 11 is also driven in reverse at 10 times normal time keeping speed so that at the time the accumulator 11 is driven back to its zero condition to open the contact 13, the secondary clocks have advanced an amount equivalent to the time interval that has been measured by the accumulator 11 during which power to the system has been interrupted. The reset drive motor 15 is energized at this time through front contact 45 of reset control relay RE because the relay RE is maintained energized during the immediate reset interval in accordance with power being maintained at this time on the normal operating channel through front contact 13*a* of accumulator 11. It will be noted that the contact 45 of the reset control relay RE maintains the reset solenoid RS deenergized at this time and thus the hourly resetting means and the 12-hour resetting means are rendered ineffective at a time when immediate reset is rendered operable.

It is provided that the master clock 10 is reset under immediate reset conditions by operating its reset motor internally at the same time as the secondary clock reset motors are operated. The normal drive for the master clock 10 is obtained by direct connection to power (designated as BX) over wire 47. Thus the master clock is operated at 10 times normal speed during the immediate reset period the same as the secondary clocks, and all secondary clocks will be further synchronized with the master clock at the next time the master clock reaches the 58 minute manifesting condition after immediate reset has been completed.

HOURLY RESET

To advance the minute hand M for hourly reset, means is provided for rotating the gear MIN at faster than normal speed to an extent to synchronize the minute hand M of each of the secondary clocks with minute manifestation means of the master clock at the end of a one minute reset interval. To accomplish this mode of operation, a clutch disc 48 carrying a clutch 49 and a leaf spring drive detent 50 is journalled on a shaft 51. The clutch disc 48 is disposed between the toothed disc SEC and a disc 52 which is secured to the gear MIN, both of which being journalled to rotate freely on shaft 51. The disc 52 has a slot 53 formed therein which can be engaged by the spring detent 50 during an hourly reset cycle for advancement of the minute hand M in case the minute hand is slow. The spring detent 50 which engages the slot 53 under these conditions is secured by a pin 54 to the clutch disc 48 as shown in FIG. 1. The spring detent 50 preferably exerts light pressure on the side of the disc 52 to provide little drag on disc 52 normally, but to engage slot 53 when required for resetting.

The clutch 49 is secured to the clutch disc 48 by a pin 55 in a manner to be freely operable about the pin 55 to selectively engage the teeth of the toothed disc SEC with its detent 49*a*. The clutch 49 is biased in a clockwise direction about the pin 55 by a leaf spring 56, which is suitably secured in an opening 57 in the clutch disc 48.

Figure 3:
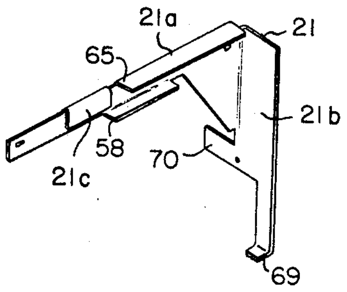
FIG. 3 is a view in perspective of a reset clutch control lever.

The clutch 49 is normally held out of engagement with the toothed disc SEC by pressure of the clutch control arm 21*a* of the reset control lever 21 by a ledge 58 as shown in FIGS. 1 and 3. This pressure rotates the clutch 49 in a counterclockwise direction about its pin 55 to an extent limited by a stop pin 59 in the clutch disc 48. The reset control lever 21 applies pressure at point 58 against the clutch 49 in accordance with the lever 21 being spring biased in a clockwise direction around its pivot point 69 by a spring 61 which connects the 12-hour reset arm 21*b* to the 12-hour latch 23 at a point 62. Thus the clutch 49 is normally disengaged from the toothed disc SEC.

When the master clock becomes operated to a 58-minute manifestation position so as to momentarily energize the relay 1HR to initiate hourly correction, alternating current is removed from the control channel by the opening of back contact 18, and direct current is applied to wire 20 of the reset channel through front contact 63 of relay 1HR and back contact 12 of the switch operated by accumulator 11. The removal of alternating current from the normal drive channel, causes the relay RE of each secondary clock to be deenergized and the closure of its back contact 45 establishes a circuit by which the reset solenoid RS can be energized with direct current applied at the master clock location to the reset channel.

The energization of the solenoid RS by a first pulse operates the reset control lever 21 in a counterclockwise direction around its pivot point 60 because of the engagement of the solenoid RS with the clutch control arm 21*a* at a point 64. The lever 21 can be rotated, however, only to an extent wherein a detent 65 formed in the clutch control arm 21*a* engages a slot 66 in the hourly latch 22 as is shown in FIG. 4A. When the pulse is terminated, the lever 21 is maintained in this position by the hourly correction latch 22 as is shown in FIG. 4A. This movement of the clutch control arm 21*a* removes pressure from the clutch 49 at the ledge 58, and thus allows the spring 56 to cause rotation of the clutch 49 in a clockwise direction about its pivot point 55 so as to engage the periphery of the toothed disc SEC and cause the clutch disc 48 to be rotated along with the disc SEC, which in turn is driven at the rate of the seconds hand S.

The clutch disc 48 is thus rotated at a speed greater than the rotation of the disc 52, which is rotated in accordance with the drive of the minute hand, and the end 50*a* of the detent 50 will thus engage the slot 53 in the disc 52 at the end of one revolution of clutch disc 48 if the secondary clock is on time, or prior to one revolution of the disc 48 if the secondary clock is slow. Even if the secondary clock is running on time it is stopped for 25 milliseconds when each pulse is transmitted, and it is advanced a comparable amount during the reset interval. Reset advance of disc 52 is permitted because of gear 43 being driven through an overrunning clutch in spider sleeve 31.

With reference to FIG. 4A, the energization of the reset solenoid RS in response to an hourly reset pulse actuates the clutch control arm 21*a* to a position wherein a detent 21*c* is raised out of a slot in the periphery of clutch disc 48 at the point 67 to permit the rotation of the clutch disc 48. The clutch 49 is disposed in the same plane as the hourly reset latch 22, and thus as the clutch disc 48 is rotated, the projecting portion 49*b* of the clutch 49 engages the end 22*a* of the hourly reset latch 22 (see FIG. 4B) to rotate the latch 22 in a counterclockwise direction to disengage the latch 22 from the cluth control arm 21*a* at the point 65. This operation takes place about 8 seconds after the hourly correction is initiated and conditions the reset control lever 21 for further actuation at times where 12-hour correction is called for.

As the disc 48 is further rotated, the detent 21*c* rests on the periphery of the disc 48 and maintains the reset control lever 21 in its actuated position until the disc 48 has been rotated for a complete revolution to a position wherein the detent 21*c* in the clutch control arm 21*a* drops into the notch 67 of the clutch disc 48. When this condition occurs, the system is restored to the normal condition that is illustrated by the position of the clock resetting apparatus of FIG. 1.

The seconds hand is stopped and held at the 60-second position during hourly reset and 12-hour reset in accordance with the engagement of a detent 68 which is yieldably secured to the gear 38 by wires 68*a* bearing on the periphery of the gear 38 and connected at its hub to the seconds drive shaft 27. With reference to FIG. 1, the detent 68 normally rotates passed a stop 69 projecting downwardly from the reset control lever 21. However, whenever the reset control lever 21 is rotated in a counterclockwise direction from its normal position as for hourly reset or for 12-hour reset, the seconds hand is stopped by the engagement of the stop 69 with the detent 68 to hold the second hand in the 60-second position until the hourly or 12-hour reset period is terminated. The wires 68*a* on the detent 68 provide normal drive of seconds hand S from the periphery of pinion 38 but this drive slips when detent 68 is stopped by the stop 69.

TWELVE HOUR RESET

In order to initiate 12-hour correction, that is, correction once every 12 hours of the hour hand H, a second pulse is transmitted by the closure of front contact 63*a* (see FIG. 1) about 8 seconds after reception of the first pulse as has been described, and this pulse energizes the reset solenoid RS of each secondary clock at a time when the secondary clock movements have been driven to the position as illustrated in FIG. 4B. The latch 22 has been operated to a position to permit the solenoid RS to fully actuate the lever 21 about its pivot point 60, and such actuation permits the detent 70 in the 12-hour reset arm 21*a* to be operated into a notch 71 in the 12-hour latch 23. This latches the lever 21 in its fully operated position for 12-hour correction, and at the same time, the latch 23 is rotated counterclockwise around its pivot point 72 so that its lower end is extended inwardly to be contacted at a point 73 by a pin 74 in the hour gear HR when the 12-hour correction is to be terminated. As long as the 12-hour latch 23 is engaged, the clutch 49 cannot be disengaged, and thus the clutch 49 will make several revolutions as required for 12-hour correction until the hour hand H is operated to manifest the same hour as is manifested by the master clock. Thus the relative positions of the hour hand H and the pin 74 are adjusted in accordance with the predetermined hour at which the 12-hour correction pulse is to be transmitted from the master clock location.

When the pin 74 contacts the 12-hour latch 23 at the point 73, it operates the latch 23 in a clockwise direction and disengages the detent 70 from the notch 71 in the latch 23 and permits the detent 70 to enter a notch 75 in the latch 23 and thus permits restoration of the resetting means of the secondary clocks to their normal positions as is illustrated in FIG. 1 upon rotation of the clutch disc 48 to a position in which the clutch 49 is disengaged by the detent 21*c* of the clutch control arm 21*a* dropping into notch 67 of disc 48 as has been heretofore described.

While there has been described what is at present considered to be the preferred embodiment of the invention, it will be obvious to those skilled in the art that various changes and modifications may be made therein, without departing from the invention.

What is claimed is:

1. A resetting system for a secondary electrical clock having respective normal drive and reset motors, time manifesting means, and reset means controlled respectively over normal and reset channels by a master clock and an accumulator at a master clock location wherein the improvement comprises;

(a) first resetting means for the secondary clock governed over the reset channel and including operation of the reset motor effective when rendered operable to reset the secondary clock by driving the time manifesting means at faster than normal speed for a time interval measured by the accumulator at the master clock location, (b) second resetting means for the secondary clock operated by the normal drive motor and initiated into a reset cycle of operation over the reset circuit for resetting the secondary clock by driving the time manifesting means to a predetermined setting at the end of the reset cycle, and (c) switching means including a switch at the secondary clock controlled from the master clock location over one of the communication channels for at times rendering the first resetting means operable in response to the energization of the reset channel and at other times rendering the second resetting means operable in response to the energization of the reset channel.

2. The system according to claim 1 wherein switch at the secondary clock is a relay.

3. The system according to claim 2 wherein means is provided for energizing the relay in response to energization of the normal operating channel.

4. A resetting system for a secondary electric clock having time manifesting means and connected by a normal operating channel and a reset channel to a master clock location comprising, (a) means at the master location for normally energizing the normal operating channel, (b) means at the master location for interrupting the energization of the normal operating channel once each hour for a short interval and for transmitting an hourly reset pulse over the reset channel during this interval, (c) an accumulator at the master location operable to measure a period of power interruption, (d) means at the master location controlled by the accumulator for energizing the reset channel upon application of power to the system after a power interruption for a time period measured by the accumulator, (e) means responsive to energization of the reset channel and including first and second resetting means for respectively resetting the secondary clock in response to the reset pulse and in response to operation of the accumulator by operating its time manifesting means at faster than normal speed, and (f) control means sensing the condition of energization of the operating channel for selectively rendering the first or the second resetting means operable in response of energization of the reset channel.

5. The system according to claim 4 wherein the control means includes a relay having its winding energized from the normal operating channel for switching between the first and second resetting means.

6. The system according to claim 4 wherein the first resetting means comprises means for driving the time manifesting means to a predetermined position by the end of a fixed time interval, and wherein the second resetting means comprises a reset motor for driving the time manifesting means at a faster than normal rate as long as the reset channel is energized during a time period measured by the accumulator.

7. A system for resetting an electric clock having time manifesting means at hourly and 12-hour intervals comprising, (a) a reset control lever having a clutch control arm and a 12-hour reset control arm respectively extending radially from a pivot point, (b) a solenoid operably connected to the other end of the clutch control arm for actuating the reset control lever, (c) remotely controlled means for energizing the solenoid at a predetermined time every hour with a single pulse and with a plurality of successive time spaced pulses at regular longer intervals, (d) latching means for engaging the clutch control arm to limit the extent of operation of the lever to a first position when the solenoid is energized by a first pulse, (e) time driven means for disengaging the latch after the first pulse and permitting full operation of the lever to a second position in response to a second pulse, and (f) means engaging the other end of the 12-hour reset control arm for latching the lever in its fully operated position until a 12-hour reset correction has been made.

8. The system according to claim 7 wherein the clock has a normally disengaged clutch which is operable when engaged to cause the time manifesting means to be driven at a faster than normal rate, and wherein the reset control lever permits engagement of the clutch only for a fixed interval when in its first position and for a longer interval if required for 12-hour correction when in its second position.

9. The system according to claim 7 wherein the clock has a seconds hand and means is provided including the 12-hour reset control arm for stopping the seconds hand at a predetermined point in its rotation when the reset control lever is either in its first or second operated position.

References Cited

UNITED STATES PATENTS

| | | | |
|---|---|---|---|
| 2,332,827 | 10/1943 | Menard et al. | 58—24 |
| 2,972,222 | 2/1961 | Rast | 58—24 |
| 3,048,964 | 8/1962 | Biorge | 58—35 |
| 3,137,121 | 6/1964 | Tringali | 58—24 |
| 3,282,043 | 11/1966 | Duris | 58—24 |

RICHARD B. WILKINSON, Primary Examiner

E. C. SIMMONS, Assistant Examiner

U.S. Cl. X.R.

58—24